UNITED STATES PATENT OFFICE.

CARL PIETZNER, OF VIENNA, AUSTRIA-HUNGARY.

PROCESS OF PREPARING SENSITIVE FILMS FOR PHOTOGRAPHING IN RELIEF.

SPECIFICATION forming part of Letters Patent No. 683,980, dated October 8, 1901.

Application filed October 20, 1900. Serial No. 33,778. (No specimens.)

*To all whom it may concern:*

Be it known that I, CARL PIETZNER, a subject of the Emperor of Austria-Hungary, residing at Vienna, in the Empire of Austria-Hungary, have invented certain new and useful Improvements in Processes of Preparing Sensitive Films for Photographing in Relief, of which the following is a specification.

My invention has relation to a process of preparing sensitive films for relief photography, and in such connection it relates more particularly to the manner in which the film of bichromated gelatin is prepared prior to its exposure in printing to the negative or positive plate from which the reproduction in relief is to be taken.

As is well known in the art, flat reliefs may be produced by exposing a film of bichromated gelatin to the action of light passing through the negative or positive plate to be reproduced and in fixing in a suitable manner, as in a bath, the treated film. The results of such treatment and action are unsatisfactory, mainly because the bichromated gelatin film is not supersensitive, and the long exposure, particularly in damp and cloudy weather, of the film results in its absorbing moisture and becoming even less sensitive, and the reliefs obtained are very flat. This susceptibility to variation under atmospheric changes and long exposure prevents good results being obtained from the film. In the British patent to Pretsch, No. 2,373, of 1854, it is suggested that by adding silver nitrate, with or without the addition of potassium bromid, to the composition from which the film is to be made the time of exposure may be shortened. By the use of these auxiliaries, however, none but flat plates are obtained, which are suitable for printing only when a galvano-plastic copy thereof is made.

The principal object of my invention is to so modify and improve the Pretsch process that the sensitiveness of the film may be increased from ten to even twenty fold and yet much higher and better modeled reliefs may be produced. To carry my invention into effect, the bichromated gelatin is mixed with silver nitrate, either with or without the addition of potassium bromid, and then to the mixture absolute alcohol is added and the mixture heated for a long time and then quickly cooled.

The technical advantages obtained by using films of high sensitiveness prepared according to my invention are, first, the possibility of reducing considerably the time of exposure, and, second, the possibility of using a fixed artificial source of light, which results in obtaining greater sharpness and graduation than are possible when the sun's rays are used, since those rays do not always strike the plate at the same constant angle, and hence the lines are spread and accurate work is impossible. The artificial light may be an electric or magnesium light or even gas-light or Roentgen rays. The short exposure of the film under the negative or positive, together with the fact that the film may now be exposed in a closed room at an even temperature, removes the possibility of the film absorbing moisture from the surrounding atmosphere in such quantities as to impair seriously the sensitiveness of the film.

A further advantage of a film prepared according to my invention resides in the fact that the layers of the preparation remain unchanged during a long period of time and do not lose, even after months have passed, their essential properties of relief and reproduction of graduation.

To carry my method into effect, a normal solution is prepared, preferably as follows: To a liter of ordinary bichromated-gelatin solution are added approximately twenty-five grams of silver nitrate. The mixture thus formed is then heated to about 60° centigrade until the solids have completely dissolved. There is then added, if required, twenty grams of potassium bromid or similar preparation, and the mixture is slightly acidulated and permitted to stand in hot water for about half an hour. To the solution is then added about one hundred grams of absolute alcohol, and the mixture is then quickly cooled and the preparation is ready for use. The preparation must be stored in the dark and handled only in the presence of a red light. By varying the amount of silver nitrate or acid preparation added to the mixture a harder or softer relief may be obtained, the reduction of the amount of silver nitrate or acid preparation being accompanied, however, by a longer heating of the mixture prior to the addition of the alcohol.

Having thus described the nature and object of my invention, what I claim as new, and desire to secure by Letters Patent, is—

1. The process of preparing sensitive films for photographing in relief, which consists in first adding silver nitrate to a solution of bichromated gelatin, then heating the mixture formed for a comparatively long period of time, then adding absolute alcohol, and finally quickly cooling the mixture.

2. The process of preparing sensitive films for photographing in relief, which consists in first adding silver nitrate to an acidulated solution of bichromated gelatin, then heating the mixture for a lengthy period of time, then adding absolute alcohol to the mixture, and finally cooling the mixture quickly.

In testimony whereof I have hereunto set my hand in presence of two subscribing witnesses.

CARL PIETZNER.

Witnesses:
C. B. HURST,
ALVESTO S. HOGUE.